3,080,191
Patented Mar. 5, 1963

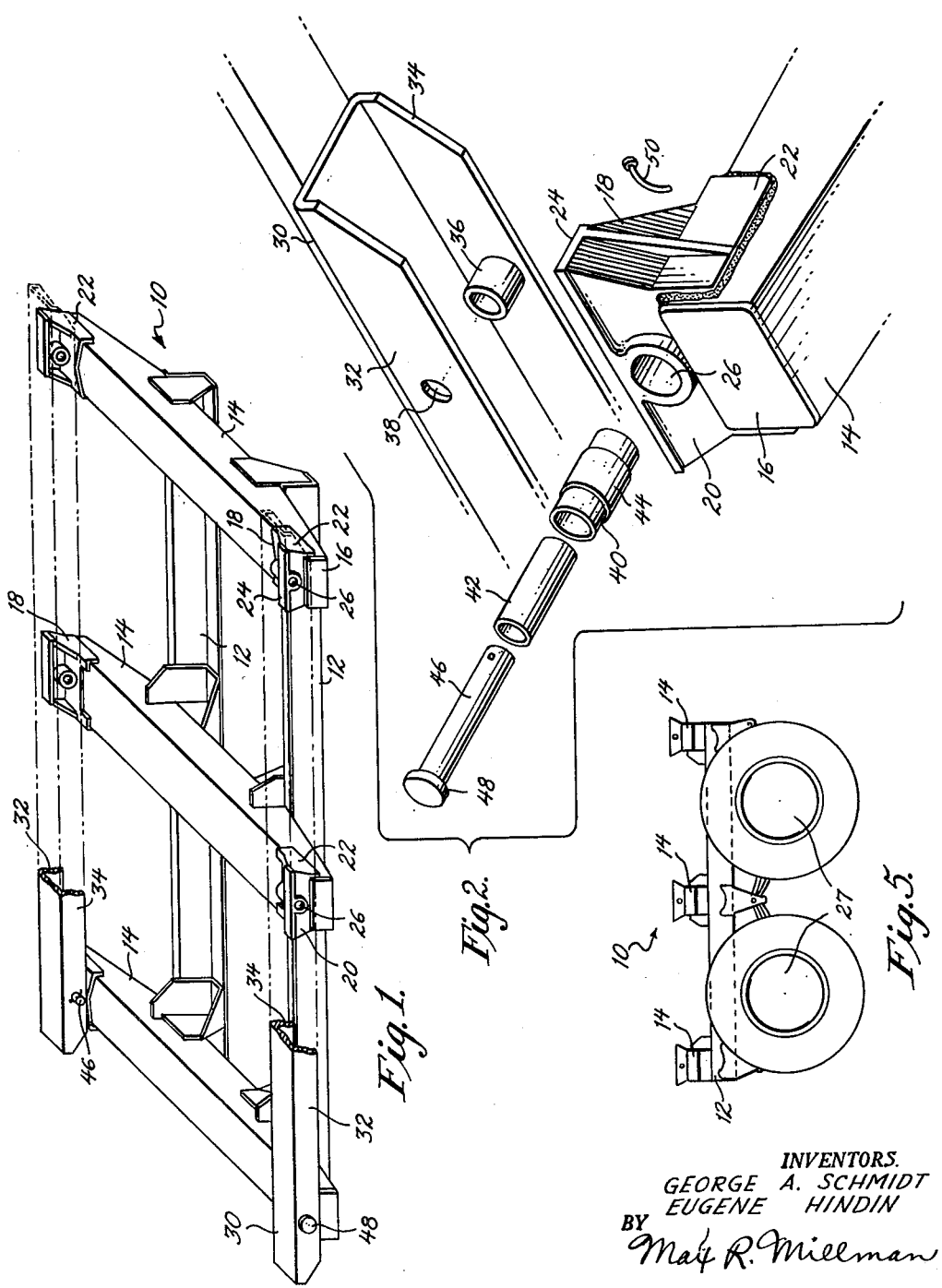

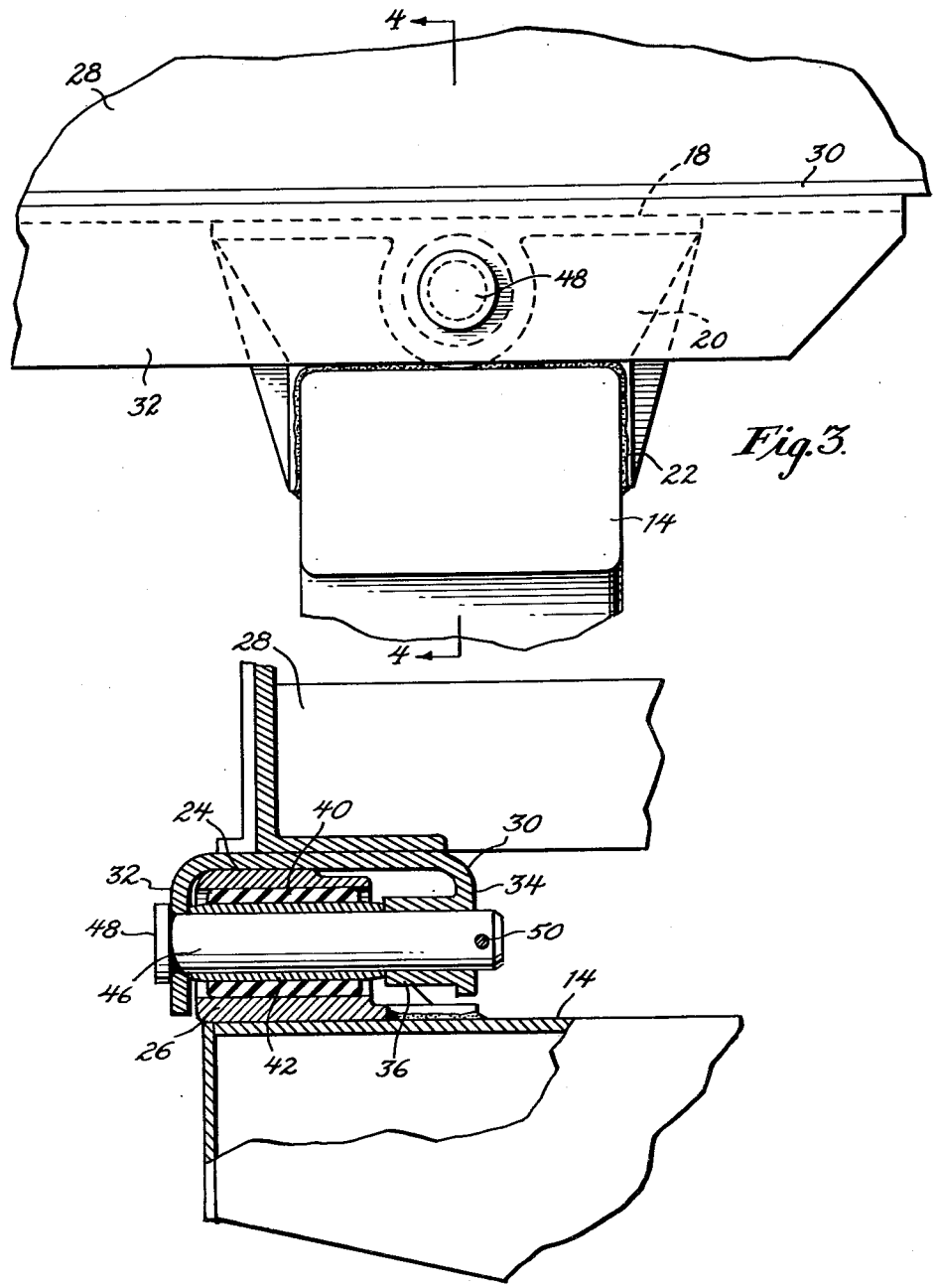

3,080,191
MEANS FOR SECURING A WHEELED UNIT TO A TRAILER BODY
George A. Schmidt, Langhorne, and Eugene Hindin, Philadelphia, Pa., assignors to Strick Trailers, Philadelphia, Pa., a division of Fruehauf Trailer Co., a corporation of Michigan
Filed Mar. 7, 1961, Ser. No. 94,073
5 Claims. (Cl. 296—35)

This invention relates to the construction of over-the-road freight hauling vehicles, such as trailers, and more specifically to a novel means of securing a wheeled unit, known in the trade as a bogie, to the freight containing or trailer body.

Heretofore, the wheeled unit or bogie was rigidly affixed to the vehicle body or vehicle-supporting subframe as by welding or by bolting. Road shock due, for example, to the impact between the vehicle and an obstacle in its path, would cause horizontal forces to be transmitted to the welded or bolted connection as well as cause the merchandise to shift in a forward direction in the vehicle body. The application of the brakes would cause the transmission of the braking force in such a way as to make the bogie exert a downward force on the welded or bolted connection as well as subject the merchandise to an up and down jouncing. Thus the welded or bolted connection was not only weakened by repeated road shocks and applications of the brakes, but at times, the forces transmitted were sufficient to actually shear the welded or bolted connection.

It is the primary object of this invention to provide a means to connect a wheeled unit or bogie to a trailer body which overcomes the disadvantages of a rigid connection as mentioned hereabove.

Another object of the invention is to provide a means to connect a wheeled unit or bogie to a trailer body which includes a sleeve of low elastic modulus to absorb the peaks of the transmitted road shocks.

Yet another object of the invention is to provide a means to connect a wheeled unit or bogie to a trailer body which permits ready removal of the bogie from the trailer body for purposes of replacement and repair.

These and other objects of the invention will become more apparent as the following description proceeds in conjunction with the accompanying drawings, wherein:

FIGURE 1 is a perspective view of the wheeled unit or bogie with the channel side members fixed to trailer body shown in place partly in solid and partly in phantom lines;

FIGURE 2 is an explosed perspective view illustrating the connection between the bogie and the channel member affixed to trailer body;

FIGURE 3 is an enlarged side elevation of the bogie beam and channel member affixed to the trailer body shown connected;

FIGURE 4 is a section taken on the line 4—4 of FIGURE 3; and

FIGURE 5 is a side elevational view of the wheeled unit or bogie per se.

In the drawings and description hereafter, similar reference characters are used for corresponing elements throughout.

The frame of the wheeled unit or bogie is shown at 10 and comprises several transversely spaced longitudinal members or beams 12 to which are welded or otherwise rigidly secured longitudinally spaced transverse or cross members 14 in the form of hollow beams. Adjacent the ends of the cross beams, which are provided with cover plates 16, are longitudinally extending support members 18. Each support member includes an outer longitudinal face 20 which is substantially flush with the end cover 16, the transverse or side surfaces of the support being in the form of wings 22 which partially straddle and are welded to the transverse sides of the cross beam 14. The upper surface 24 of each support member is substantially flat. Each support member is also provided with a tubular bearing 26 which extends transversely of the bogie frame or in a direction generally parallel to the axes of the cross members 14. The frame 10 mounts conventional spring suspensions and wheels 27 in a manner well known in the art.

Secured to and beneath the trailer body 28 are longitudinal side rails or sills 30 of inverted channel construction, the length of said side channels and their attachment to the trailer body itself being such as to allow for attachment of the bogie at the desired rear portion of the trailer body. The outer leg 32 of each channel rail 30 straddles the outer faces 20 of the bogie support members 18. The inner leg 34 of each channel rail 30 includes an inwardly extending hollow boss 36 which is directly opposite to or in horizontal alignment with an aperture 38 which is provided in the outer leg 32 of the channel rail. There are as many bosses 36 and opposed apertures 38 as there are support members on the bogie frame cross beams and the spacing longitudinally is such as to enable each pair of bosses and opposed apertures on the trailer channel rails to be positioned in horizontal registry with a corresponding bearing 26 of the bogie frame support member 18.

Before the bogie is slid relative to the trailer body beneath the channel rails there is inserted in the bore of each bearing 26 a sleeve or bushing 40 made of a material having a lowe elastic modulus, desirably in the order of magnitude of at least 500 p.s.i., such as rubber. This resilient bushing is bonded to an inner tubular metallic liner 42 which assists in inserting the resilient bushing into the bearing 26. It will be noted that the major outside diameter of the bushing approximates the inner diameter of the bearing 26 but the bushing has a central enlarged portion 44 of greater outside diameter which flattens out upon contact with the inner wall of said bearing thus assuring a tight fit. A pin 46 is provided of diameter approximating the inner diameter of metallic liner 42, the same being passed through said liner and the tubular boss 36 until the head 48 contacts the outer leg 32 of the channel side rail 30. A diametric hole is provided adjacent the freen end of the pin to receive a drive lock pin 50, preferably a spreadable cotter pin or C-shaped retaining ring.

Minor variations may be made by a skilled artisan without departing from the invention and the scope of the appended claims.

We claim:

1. In combination with a vehicle body and a wheeled frame, a means connecting said wheeled frame to said vehicle body comprising longitudinally spaced supports on said wheeled frame, said supports including longitudinal flat surfaces in a common horizontal plane, and bearings beneath said flat surfaces, a longitudinally extending rail member secured to and beneath said vehicle body and having a flat surface bearing on the flat surfaces of said supports and including a depending flange overlapping a face of each of said supports, said flange being provided with longitudinally spaced apertures alignable with the bores of said bearings, a headed pin extending through each of said apertures and said bearing, and a bushing of low elastic modulus interposed between said pin and said bearing.

2. The combination of claim 1 and means removably retaining each of said pins in said bearings.

3. The combination of claim 1 wherein each of said bushings is a rubber sleeve, and a tubular metallic liner bonded to said bushing interiorly thereof, said liner receiving said pin, said bushing pressing against the wall of the bore of said bearing.

4. In combination with a vehicle body and a wheeled frame having longitudinally spaced, transversely extending beams, a means connecting said wheeled frame to said vehicle body comprising longitudinally spaced supports on said beams, said supports including longitudinal flat surfaces in a common horizontal plane, each support also including a transversely extending bearing beneath said flat surface, a longitudinally extending rail member secured to and beneath said vehicle body and having a flat surface bearing on the flat surfaces of said supports and including a depending flange overlapping a face of each of said supports, said flange being provided with longitudinally spaced apertures transversely alignable with the bores of said bearings, a headed pin extending through each of said apertures and said bearing, and a bushing of low elastic modulus interposed between said pin and said bearing, said bushings acting to absorb the strains due to the flexiing of the beams as well as to take up longitudinal and rebound loads.

5. In combination with a vehicle body and a wheeled frame having longitudinally spaced, transversely extending beams, a means connecting said frame to said body comprising longitudinally spaced supports secured on the ends of said beams, said supports each including a longitudinal upper surface and a transversely extending tubular bearing therebeneath, longitudinally extending inverted channel rail members secured to and beneath said vehicle body and including a web and depending inner and outer legs, said web bearing on said upper surfaces of said supports with the outer leg of said rail member overlapping a face of said support, said outer leg being provided with longitudinally spaced apertures transversely alignable with the bores of said bearings, said inner leg having longitudinally spaced tubular bosses transversely alignable with said apertures and said bores of said bearings, a headed pin extending through each of said apertures, bearings and bosses, and a bushing of low elastic modulus interposed between said pin and said bearing, said bushings acting to absorb the strains due to the flexing of the beams as well as to take up longitudinal and rebound loads.

References Cited in the file of this patent
UNITED STATES PATENTS

| | | |
|---|---|---|
| 2,041,936 | Kliewer | May 26, 1936 |
| 2,144,170 | Utz | Jan. 17, 1939 |
| 2,620,201 | Brady | Dec. 2, 1952 |
| 2,769,656 | Lee | Nov. 6, 1956 |
| 2,951,710 | Willetts | Sept. 6, 1960 |
| 3,010,757 | De Haan | Nov. 28, 1961 |